United States Patent
Cansizoglu et al.

(10) Patent No.: US 9,807,365 B2
(45) Date of Patent: Oct. 31, 2017

(54) SYSTEM AND METHOD FOR HYBRID SIMULTANEOUS LOCALIZATION AND MAPPING OF 2D AND 3D DATA ACQUIRED BY SENSORS FROM A 3D SCENE

(71) Applicant: Mitsubishi Electric Research Laboratories, Inc., Cambridge, MA (US)

(72) Inventors: Esra Cansizoglu, Malden, MA (US); Yuichi Taguchi, Arlington, MA (US); Srikumar Ramalingam, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 14/962,257

(22) Filed: Dec. 8, 2015

(65) Prior Publication Data
US 2017/0161901 A1    Jun. 8, 2017

(51) Int. Cl.
*G06K 9/00* (2006.01)
*H04N 13/02* (2006.01)
(Continued)

(52) U.S. Cl.
CPC .......... *H04N 13/0207* (2013.01); *G06K 9/46* (2013.01); *G06T 7/0028* (2013.01);
(Continued)

(58) Field of Classification Search
CPC ....... G06T 7/0032; G06T 7/344; G06T 7/579; G06T 7/75; G06T 2207/10028;
(Continued)

(56) References Cited

U.S. PATENT DOCUMENTS

| 7,162,338 B2 | 1/2007 | Goncalves et al. |
| 7,774,158 B2 | 8/2010 | Domingues Goncalves et al. |

(Continued)

OTHER PUBLICATIONS

Zhang et al., "Real-time depth enhanced monocular odometry," Proc. IEEE/RSJ Int'l Conf. Intelligent Robots and Systems (IROS), Sep. 2014.
(Continued)

*Primary Examiner* — Mekonen Bekele
(74) *Attorney, Agent, or Firm* — Gene Vinokur; James McAleenan; Hironori Tsukamoto

(57) ABSTRACT

A method and system for registering data by first acquiring the data from a scene by a sensor at different viewpoints, and extracting, from the data, three-dimensional (3D) points and 3D lines, and descriptors associated with the 3D points and the 3D lines. A first set of primitives represented in a first coordinate system of the sensor is selected, wherein the first set of primitives includes at least three 3D points. A second set of primitives represented in a second coordinate system is selected, wherein the second set of primitives includes any combination of 3D points and 3D lines to obtain at least three primitives. Then, using the first set of primitives and the second set of primitives, the 3D points are registered with each other, and the 3D points with the 3D lines to obtain registered primitives, wherein the registered primitives are used in a simultaneous localization and mapping (SLAM) system.

13 Claims, 3 Drawing Sheets

(51) Int. Cl.
*G06K 9/46* (2006.01)
*G06T 7/00* (2017.01)
*G06T 7/33* (2017.01)

(52) U.S. Cl.
CPC .............. *G06T 7/0075* (2013.01); *G06T 7/33* (2017.01); *G06T 2200/04* (2013.01); *G06T 2207/10012* (2013.01); *G06T 2207/10028* (2013.01)

(58) Field of Classification Search
CPC ............ G06T 2207/30244; G06T 7/33; G06T 2207/10012; G06T 2207/30184
USPC ................................ 382/154, 107, 295, 103
See application file for complete search history.

(56) References Cited

U.S. PATENT DOCUMENTS

| | | | | |
|---|---|---|---|---|
| 8,290,305 | B2* | 10/2012 | Minear | G06T 7/32 345/629 |
| 9,183,631 | B2* | 11/2015 | Taguchi | G06T 7/579 |
| 9,430,847 | B2* | 8/2016 | Ramalingam | G06K 9/52 |
| 2008/0292180 | A1* | 11/2008 | Kobayashi | G06K 9/209 382/154 |
| 2010/0094460 | A1* | 4/2010 | Choi | B25J 9/1692 700/251 |
| 2011/0060556 | A1* | 3/2011 | Ramalingam | G06T 7/33 703/1 |
| 2014/0003705 | A1* | 1/2014 | Taguchi | G06T 7/579 382/154 |
| 2014/0037136 | A1* | 2/2014 | Ramalingam | G06T 7/579 382/103 |
| 2014/0320593 | A1 | 10/2014 | Pirchheim et al. | |
| 2015/0154467 | A1* | 6/2015 | Feng | G06K 9/48 382/203 |
| 2015/0269436 | A1* | 9/2015 | Kim | G06K 9/00624 382/103 |
| 2015/0363938 | A1* | 12/2015 | Ramalingam | G06K 9/52 382/103 |
| 2016/0189381 | A1* | 6/2016 | Rhoads | G06T 7/579 382/103 |
| 2016/0321827 | A1* | 11/2016 | Xiao | G06T 7/602 |

OTHER PUBLICATIONS

A. J. Davison, I. D. Reid, N. D. Molton, and O. Stasse, "MonoSLAM: Real-time single camera SLAM," IEEE Trans. Pattern Anal. Mach. Intell., vol. 29, No. 6, pp. 1052-1067, Jun. 2007.
G. Klein and D. Murray, "Parallel tracking and mapping for small AR workspaces," in Proc. IEEE Int'l Symp. Mixed and Augmented Reality (ISMAR), Nov. 2007, pp. 1-10.
A. J. B. Trevor, J. G. Rogers III, and H. I. Christensen, "Planar surface SLAM with 3D and 2D sensors," in Proc. IEEE Int'l Conf. Robotics and Automation (ICRA), May 2012, pp. 3041-3048.
Y. Taguchi, Y.-D. Jian, S. Ramalingam, and C. Feng, "Point-plane SLAM for hand-held 3D sensors," in Proc. IEEE Int'l Conf. Robotics and Automation (ICRA), May 2013, pp. 5182-5189.
Feng et al., "Fast plane extraction in organized point clouds using agglomerative hierarchical clustering," Proc. IEEE Int'l Conf. Robotics and Automation (ICRA), May 2014.
Jégou et al., "Aggregating local image descriptors into compact codes," IEEE Trans. Pattern Anal. Mach. Intell., vol. 34, No. 9, pp. 1704-1716, Sep. 2012.
G. Hu, S. Huang, L. Zhao, A. Alempijevic, and G. Dissanayake, A robust RGB-D SLAM algorithm, IROS 2012.
Haralick et al., "Review and analysis of solutions of the three point perspective pose estimation problem," Int'l J. Computer Vision, vol. 13, No. 3, pp. 331-356, Dec. 1994.
Lu Yan et al. "Robust RGB-D Odometry using Point and Line Features," 2015 IEEE International Conference on Computer Vision, IEEE. Dec. 7, 2015. pp. 3934-3942.
Ataer-Cansizoglu et al. "Tracking an RGB-D Camera using Points and Planes," 2013 IEEE International Conference on Computer Vision Workshops, IEEE. Dec. 2, 2013. pp. 51-58.
Ataer-Cansizoglu et al. "Pinpoint SLAM: A hybrid of 2D and 3D simultaneous localization and mapping for RGB-D sensors," 2016 IEEE International Conference on Robotics and Automation, ICRA, May 16, 2016. pp. 1300-1307.

\* cited by examiner

SYSTEM AND METHOD FOR HYBRID SIMULTANEOUS LOCALIZATION AND MAPPING OF 2D AND 3D DATA ACQUIRED BY SENSORS FROM A 3D SCENE

RELATED APPLICATION

This U.S. Non-Provisional Application is related to U.S. Non-Provisional application Ser. No. 14/962,239, co-filed herein with and incorporated herein by reference. That Application discloses a method and system for detecting and tracking objects using a red, green, blue, and depth (RGB-D) data acquired by an RGB-D sensor using simultaneous localization and mapping (SLAM) and hierarchical feature grouping.

FIELD OF INVENTION

This invention relates to registering two-dimensional (2D) and three-dimensional (3D) data, and more particularly to registering 2D and 3D data obtained from an RGB-D sensor for sensor pose estimation, and computer vision applications such as 3D scene reconstruction, robotics, and augmented reality.

BACKGROUND OF THE INVENTION

Simultaneous localization and mapping (SLAM) is used for many applications in computer vision, robotics, and augmented reality. An essential part of SLAM system is sensor localization. This involves registration of primitives in a sensor coordinate system with a SLAM map coordinate system. SLAM using monocular sensors is well known. With the prevalence of low-cost 3D sensors, many SLAM systems make use of both color and depth data using red, green, blue, and depth (RGB-D) sensors, such as a Microsoft Kinect® sensor.

Although RGB-D sensors can increase registration accuracy, such sensors typically provide accurate depths only in a limited range, e.g., 0.5 m to 4 m for Kinect®, due to hardware limitations and noise. Most RGB-D SLAM systems only use pixels with valid depths, while ignoring pixels associated with scene points that are too close or too far from the sensor. This is an ineffective use of information provided by the sensors and might introduce registration inaccuracy, especially for scenes with large depth variations.

Most conventional SLAM systems use a single type of primitive, e.g., either 2D points or 3D points, as measurement. For example, feature-based monocular SLAM systems extract 2D point features, use 2D-to-2D point correspondences to initialize 3D point landmarks by triangulation, and then use 2D-to-3D correspondences between the 2D point measurements and the 3D point landmarks to estimate the sensor pose in consecutive images, see Davison et al., "MonoSLAM: Real-time single camera SLAM," IEEE Trans. Pattern Anal. Mach. Intell., vol. 29, no. 6, pp. 1052-1067, June 2007, and Klein and Murray, "Parallel tracking and mapping for small AR workspaces," Proc. IEEE Int'l Symp. Mixed and Augmented Reality (ISMAR), pp. 1-10, November 2007.

Feature-based RGB-D SLAM systems extract 3D point features and estimate the sensor pose using 3D-to-3D point correspondences. Plane features can also be used as measurements in some SLAM systems. Recent dense SLAM systems, both monocular and RGB-D, do not rely on feature extraction but rather exploit all the 2D or 3D points in images and minimize photometric errors or iterative closest point (ICP) costs for direct registration. However, those systems still only use a single type of primitive, either 2D points or 3D points.

Some SLAM systems use a hybrid of 3D measurements. One system uses both plane-to-plane and line-to-plane correspondences, see Trevor et al., "Planar surface SLAM with 3D and 2D sensors," Proc. IEEE Int'l Conf. Robotics and Automation (ICRA), pp. 3041-3048, May 2012. Another system uses both point-to-point and plane-to-plane correspondences, see Taguchi et al., "Point-plane SLAM for hand-held 3D sensors," Proc. IEEE Int'l Conf. Robotics and Automation (ICRA), pp. 5182-5189, May 2013. However, all the measurements used in their systems are 3D primitives.

Some systems address the problem of the lack of depth measurements in some parts of RGB-D images and used both 2D and 3D measurements, see Hu et al., "A robust RGB-D SLAM algorithm," Proc. IEEE/RSJ Int'l Conf. Intelligent Robots and Systems (IROS), October 2012, and Zhang et al., "Real-time depth enhanced monocular odometry," Proc. IEEE/RSJ Int'l Conf. Intelligent Robots and Systems (IROS), September 2014. Hu et al. heuristically switches between 2D-to-2D and 3D-to-3D correspondences according to available depths, and thus they do not use both correspondences in a single registration. Zhang et al. use both 2D and 3D measurements to register two images for visual odometry, but the 3D measurements are assumed only in one of the two images, and thus 2D-to-3D correspondences are used.

SUMMARY OF THE INVENTION

The embodiments of the invention provide a system and method for joint registration of 3D points and 3D lines. The method can be used in a simultaneous localization and mapping (SLAM) system.

Registration is the most essential part of a SLAM system where measurements extracted from a frame are registered with respect to landmarks in a global SLAM map. Conventional SLAM systems with an RGB-D sensor use depths only for a limited range due to hardware limitation and noise of the RGB-D sensor. Depths in the scene that are too far or too close from the sensor are not used. Such systems introduce registration errors, especially in scenes with large depth variations.

The embodiments of the invention provide a novel RGB-D SLAM system and a method that uses point measurements with and without depths. The system extracts keypoints from RGB frames (images). Keypoints with valid depths become 3D point features, while keypoints without valid depths are considered as 2D point features. A 2D point of a frame is represented with a 3D line passing through the optical center of the sensor and the 2D image coordinate of the 2D point based on sensor pose and sensor intrinsic parameters.

Then, point-to-point, line-to-point, and line-to-line correspondences are determined. For the line-to-point correspondences, we use the 3D lines associated by the 2D point features to "pinpoint" the corresponding 3D point features, and to generate longer-range constraints than using only point-to-point correspondences. For the line-to-line correspondences, the 3D lines are triangulated to generate 3D points that are used as 3D point features in the subsequent processing. Herein, 3D lines and 2D points are used interchangably as they both refer to the keypoints without valid depths. The system can also extract planes to generate 3D plane features, and use plane-to-plane correspondences in addition to the point-to-point, line-to-point, and line-to-line correspondences to further improve the registration accuracy.

The hybrid correspondences are used in both online SLAM and offline postprocessing. The online SLAM focuses more on processing speed by determining correspondences among consecutive images for real-time operations, while the offline postprocessing generates more correspondences among all the images for higher accuracy.

DETAILED DESCRIPTION OF THE PREFERRED EMBODIMENTS

The embodiments of the invention provide a system and method for hybrid simultaneous localization and mapping of 2D and 3D data acquired by a red, green, blue, and depth (RGB-D) sensor.

Figure 1B:
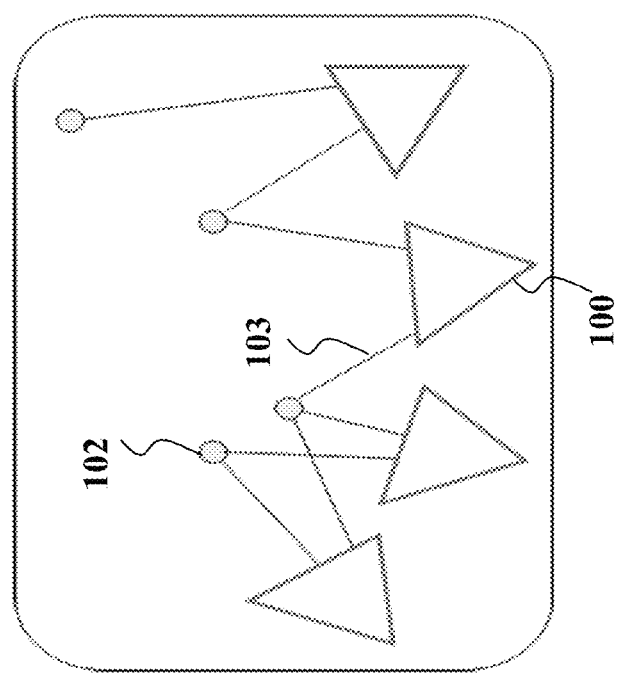
FIG. 1B schematically shows conventional 3D measurements.
Figure 1A:
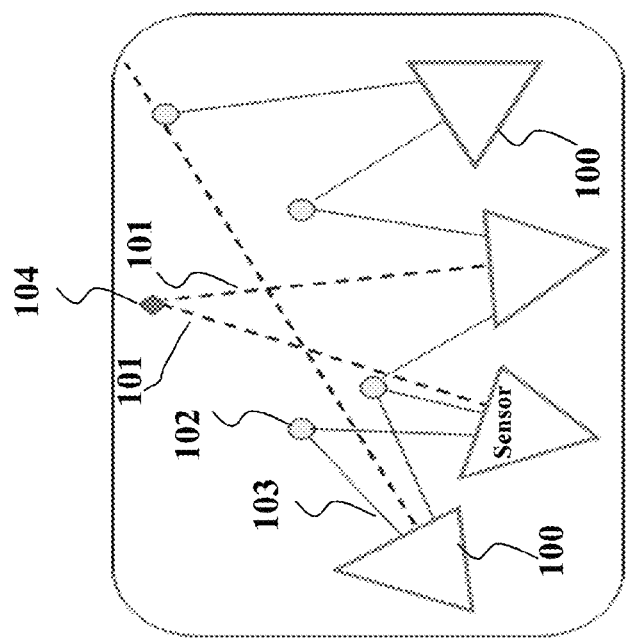
FIG. 1A schematically shows 2D and 3D point measurements according to embodiments of the invention.

FIG. 1A schematically shows the key idea of "pinpointing" 3D points from 2D points used by embodiments of our invention. Triangles 100 represent a sensor at different poses (viewpoints), i.e., different 3D positions and 3D orientations. Alternatively, multiple sensors can be used.

Dashed lines 101 represent the lines associated with 2D measurements (i.e., 2D keypoints with invalid depths), and circles 102 and solid lines 103 represent 3D measurements. Triangulated 3D points are shown with diamonds 104. The triangulation uses the intersection of the lines 101. In addition to point-to-point correspondences that are used in a conventional SLAM system, we use line-to-point and line-to-line correspondences to generate long-range constraints. The lines defined by the 2D points (keypoints with invalid depth) "pinpoint" the 3D points, i.e., keypoints with valid depths, or 3D points triangulated by intersecting the lines.

FIG. 1B shows a conventional SLAM system that uses only point-to-point correspondences, resulting in short-range constraints between images due to the limited depth range.

In contrast to the conventional SLAM system, our system extracts both 2D and 3D measurements from images, where keypoints with valid depths become 3D measurements, and keypoints without valid depths are treated as 2D measurements. Then, the system establishes point-to-point, line-to-point, and line-to-line correspondences. The additional correspondences including 2D measurements provide long-range constraints between the images. That is, we "pinpoint" 3D points with the lines defined by 2D points.

Our system can additionally extract planes to generate 3D plane features, and use plane-to-plane correspondences in addition to the point-to-point, line-to-point, and line-to-line correspondences to further improve the registration accuracy.

We use the hybrid correspondences in both online SLAM and offline postprocessing. For online SLAM, we limit the correspondence search among neighboring images for real-time processing. This approach generates longer-range constraints than conventional approaches using only point-to-point correspondences, but does not exploit correspondences that might exist between distant images.

Our postprocessing establishes such correspondences by iteratively determining the hybrid correspondences between each image and a SLAM map generated using measurements and correspondences from all images. In each iteration, the correspondences are first updated based on the current poses of the images, which are then used to update the poses using a bundle adjustment procedure.

Pinpoint SLAM and Postprocessing

Figure 2:
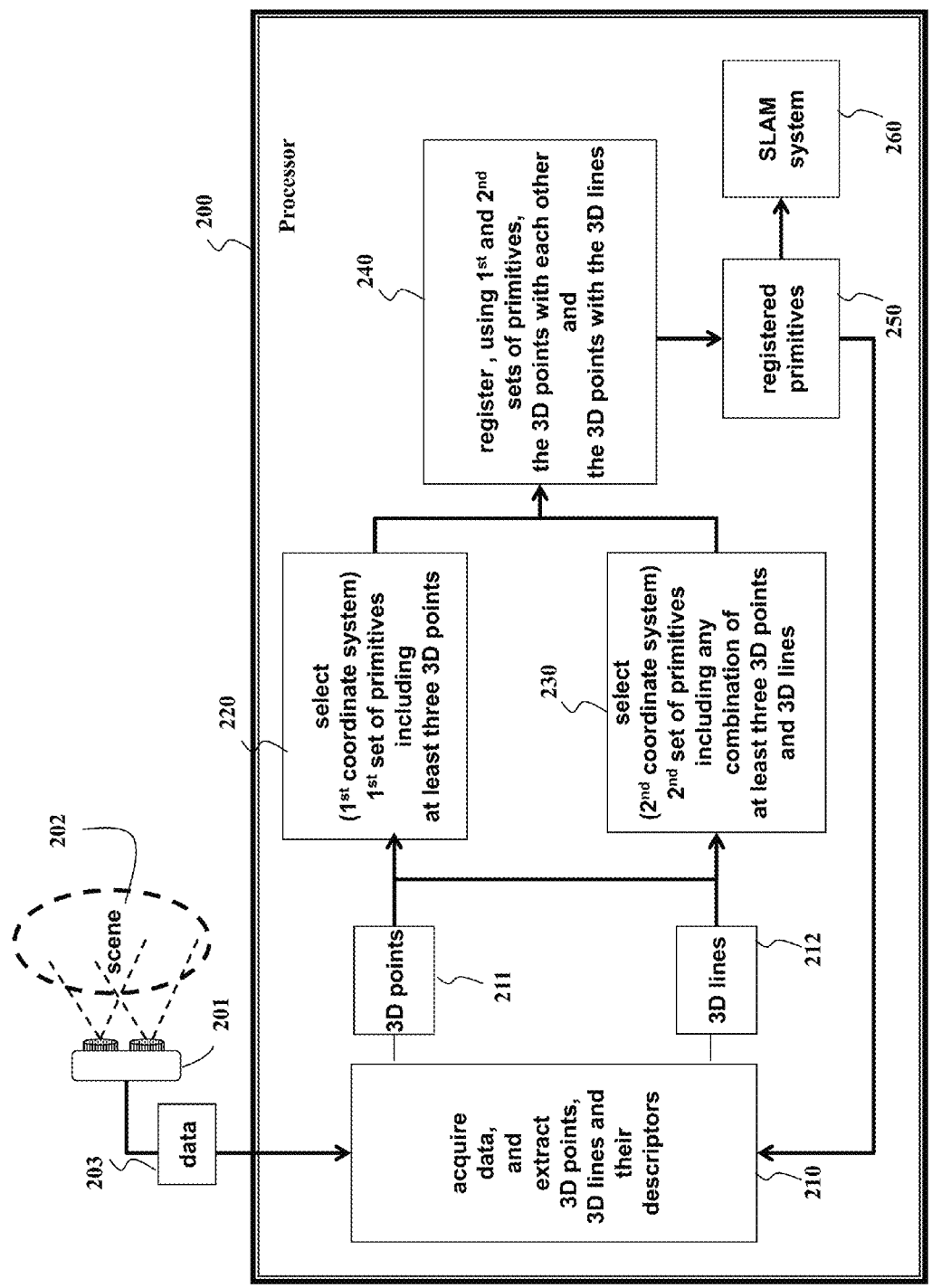
FIG. 2 is a schematic of a system and method for hybrid simultaneous localization and mapping (SLAM) of 2D and 3D data acquired by a sensor according to embodiments of the invention.
Figure 3:
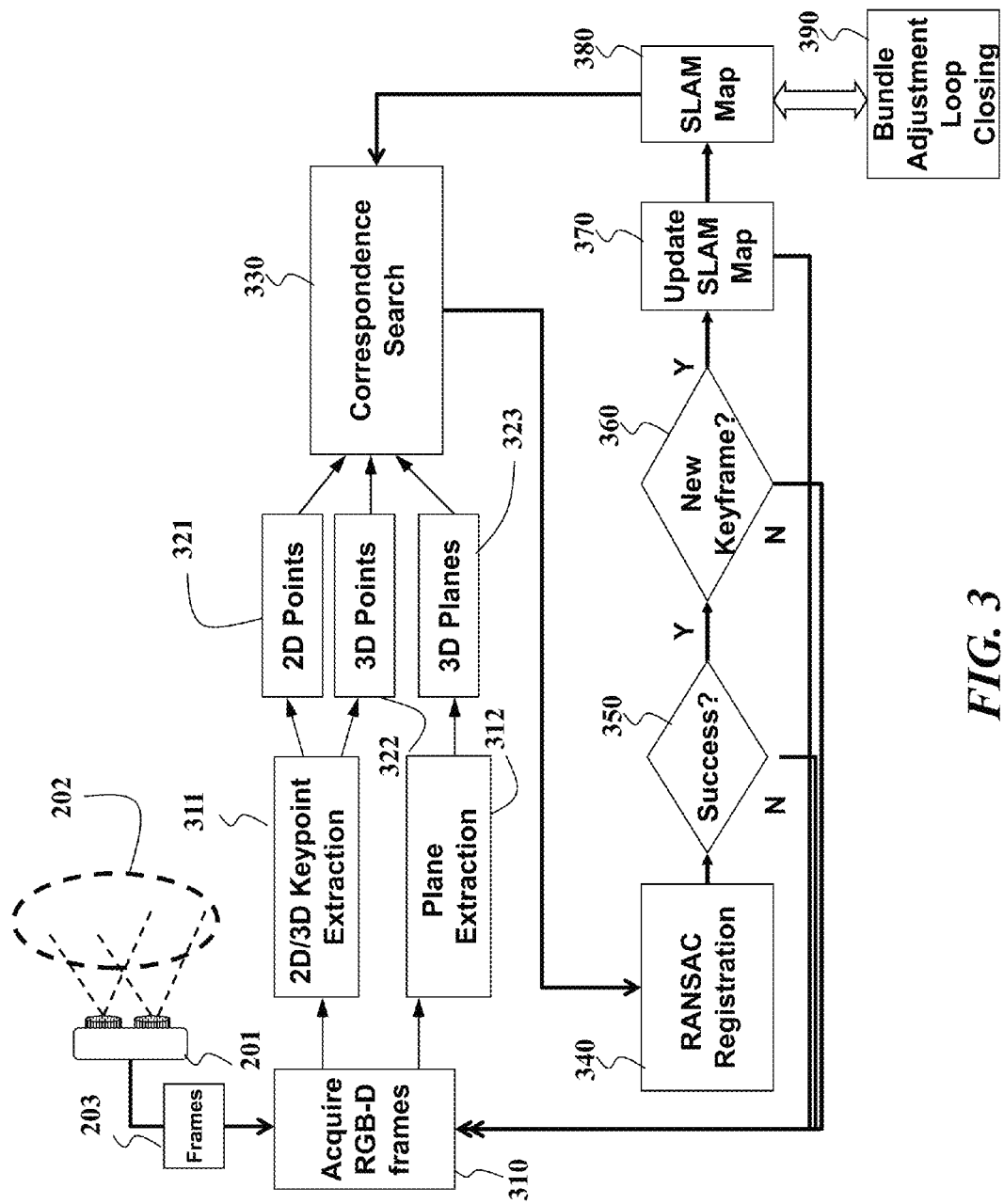
FIG. 3 is a schematic of further details of the system and method of FIG. 2.

This section describes our registration method that uses 3D points and 3D lines. Our method can be incorporated into any point-feature-based RGB-D SLAM systems. Here we provide an example using a keyframe-based SLAM system, which stores representative keyframes in a SLAM map. An overview of our registration method can be seen in FIG. 2, and our SLAM system using the registration method can be seen in FIG. 3.

We use the method for both online SLAM and offline postprocessing. In the online SLAM, we process each input frame once and register the frame to a SLAM map 380 including previous measurements and correspondences of keyframes. In the offline postprocessing, we process each keyframe in the SLAM map to register the keyframe with all of the keyframes in the SLAM map, and iterate the process as long as the poses of the keyframes are updated.

Notations

We use conventional terminology of measurements and landmarks. The system extracts measurements from each RGB-D frame and generates landmarks in a global SLAM map.

A 3D point measurement is $(p_m, D_m)$, where $p_m \in \mathbb{R}^3$ denotes its 3D position and $D_m$ denotes its associated descriptor. A 2D point measurement is $(q_m, v_m, \tilde{D}_m)$, where $q_m=(q_x, q_y) \in \mathbb{R}^2$ represents the 2D pixel coordinates, $\tilde{D}_m$ is its associated descriptor, and $v_m=(c_m, u_m)$ represents a 3D line passing through the optical center of the sensor and the 2D point measurement such that $$\{x | x = c_m + tu_m, t \in \mathbb{R}\},$$

$$c_m = [0,0,0]^T \text{ and}$$

$$u_m = [(q_x - c_x)/f_x, (q_y - c_y)/f_y, 1]^T$$

based on intrinsic parameters of the sensor, i.e., the focal lengths ($f_x$, $f_y$) and the principal point ($c_x$, $c_y$), and T is a transpose operator.

A 3D plane measurement is represented by $(\pi_m, I_m)$, denoting plane parameters and the set of 3D inlier points associated to the plane.

A landmark is a collection of measurements. A 3D point landmark is represented by $(p_l, D_l)$, where $p_l \in \mathbb{R}^3$ denotes its 3D position and $D_l$ denotes the set of descriptors associated to this landmark. A 3D plane landmark is $(\pi_l, I_l)$ with plane parameters $\pi_l$ and the set of 3D inlier points from all the associated frames $I_l$.

Registration Method

We acquire 210 data 203 of a 3D scene 202 with a red, green, blue, and depth (RGB-D) sensor 201. The data can be acquired as a sequence of frames for different poses (viewpoints) of the sensor, or alternatively multiple sensors are used. From the data in each frame, we extract 3D points 211 and 3D lines 212 and associated descriptors.

We select 220 a first set of primitives including at least three 3D points represented in a first coordinate system. We also select 230 a second set of primitives represented in a second coordinate system, wherein the second set of primitives includes any combination of 3D points and 3D lines to obtain a total of at least 3 primitives.

Then, we register jointly 240, using the first set of primitives and the second set of primitives, the 3D points with each other, and the 3D points with the 3D lines to obtain registered primitives 250. The registering can use random sample consensus (RANSAC). The registered primitives can be used in any type of SLAM system 260. The steps are performed in a processor 200.

Feature Extraction

Our system extracts 311 2D keypoints from each RGB image. Each keypoint has a location (x, y) and an associated descriptor. The 2D keypoints can be obtained by using, e.g., scale-invariant-feature-transform (SIFT) keypoint detector and descriptor, but any kind of keypoint detector and descriptor can be used for this step. If the corresponding depths are within a predefined range, then the depths are considered valid. The keypoints with valid depths are back-projected and used as 3D point measurements 322. Keypoints with invalid depths are considered as 2D point measurements 321 and represented as the 3D lines passing through the optical center of the sensor and the 2D keypoints.

We can also extract 312 3D plane measurements 323 using, e.g., agglomerative hierarchical clustering, see Feng et al., "Fast plane extraction in organized point clouds using agglomerative hierarchical clustering," Proc. IEEE Int'l Conf. Robotics and Automation (ICRA), May 2014.

Feature extraction step is omitted during postprocessing, because the postprocessing is applied to an existing SLAM map where the features are already extracted.

Note that the keypoints can be extracted from an intensity image, instead of an RGB image. Thus, our system can use intensity and depth frames as the input, instead of RGB-D frames. Herein, a pixel image is used to refer to either an intensity image or an RGB image.

Correspondence Search

After feature extraction, we determine the correspondences 330 between the keypoints extracted from the current frame and the keypoints in the SLAM map. Plane correspondences are not searched because the number of planes are much less than the number of points. Instead, our RANSAC registration considers all possible plane correspondences.

Online SLAM

We perform all-to-all descriptor matching between the keypoints of the current frame and the keypoints of the last k keyframes of the SLAM map. Considering k keyframes, instead of all keypoints of the map, reduces the time for the search because the last keyframes more likely observe the same region in the scene as the current frame assuming a continuous sensor motion. The matching returns the following correspondences, point-to-point, line-to-point and line-to-line correspondences, each of which are specially considered in the RANSAC registration phase. Line-to-point correspondences consider two cases: from 3D point landmark to 2D point measurement or from 2D point landmark to 3D point measurement.

Offline Postprocessing

We avoid unnecessary descriptor matches by using the pose of the keyframe as a prediction. We project all 3D points of the map to the frame based on the predicted pose. A measurement in the frame is matched with a 3D point landmark, if its projection falls within a neighborhood of r pixels. This generates either point-to-point correspondences or correspondences from 3D landmark to 2D measurement (i.e., point-to-line). For point-to-line correspondences that are between 2D landmarks and 3D measurements, the search is done in a similar way with a change in the direction of the projection, i.e., a 3D point measurement of the frame is projected to the keyframe that initiates the 2D point landmark. In terms of line-to-line correspondences, we test the distance to epipolar line to be less than r pixels in order to match a 2D point measurement with a 2D point landmark.

RANSAC Registration

The RANSAC registration 340 tries different types of hypothesis in the order of (i) three planes, (ii) two planes+one 3D point, (iii) one plane+two 3D points, and (iv) three 3D points. Because we use 2D point measurements, we also add a last hypothesis to this list, which considers three line-to-point correspondences.

We apply a perspective-three-point (P3P) procedure to determine the registration parameters using the line-to-point correspondences, see Haralick et al., "Review and analysis of solutions of the three point perspective pose estimation problem," Int'l J. Computer Vision, vol. 13, no. 3, pp. 331-356, December 1994. Note that in addition to the line-to-point correspondences, we can treat a point-to-point correspondence as a line-to-point correspondence by ignoring the depth of one of the 3D points.

The RANSAC inlier check is carried out based on the type of the correspondence. Two 3D points are considered inliers when the distance between the points is less than a threshold. For line-to-point correspondences, we consider the distance between the 3D point and the line corresponding to the 2D point. The distance between a 3D point landmark $p_l$ and a 2D point measurement $q_m$ is $\mathfrak{d}(p_l, q_m)$ $$t^* = \frac{\langle u_m, T^{-1}p_l - c_m \rangle}{\langle u_m, u_m \rangle} \quad (1)$$

$$\mathfrak{d}(p_l, q_m) = \|p_l - (c_m + t^* u_m)\| \quad (2)$$

where T is the pose of the keyframe that contains 2D point measurement and $\langle \bullet, \bullet \rangle$ denotes the dot product. If the distance is less than the threshold, then the correspondence is counted as an inlier. For line-to-line correspondences, we check the distance of the pixel to the corresponding epipolar line of the other point to be less then the threshold.

SLAM Map Update

If the RANSAC registration succeeds 350, the estimated pose and inlier correspondences are used to update 370 the SLAM map 380.

Online SLAM

A frame is added to the map as a new keyframe 360 when its estimated pose is different from the poses of already existing keyframes in the map. If a 2D measurement is matched with a 3D point landmark, then the set of descriptors are enlarged by adding the descriptor of the 2D measurement. For the case of a line-to-line match, we perform triangulation by determining the middle of the closest points on the two lines, and add it to the map as a 3D point landmark by collecting the descriptors of the 2D measurements. We ignore triangulation for line-to-line matches with a small camera baseline as it introduces noise. If a 3D point measurement is matched with a 2D point landmark, then the landmark is updated as a 3D point landmark via the 3D coordinates of the 3D point measurement transferred to the map coordinate system. All unmatched point measurements are added to the map as point landmarks.

Offline Postprocessing

Because the postprocessing is applied to an existing map, all measurements are already associated to the landmarks. Hence, this stage only updates the correspondences between the keyframe and the map. RANSAC inliers are used to refine the correspondences of the keyframe. If a measurement is matched with a different landmark than what it is currently associated to, then the measurement is removed from the current landmark and associated with the new inlier landmark. Similarly, if a measurement is not matched with its current landmark, then the measurement is split from that landmark, and a new landmark is generated.

Bundle Adjustment

A triplet (k, l, m) denotes an association where a 3D point landmark $p_l$ (l=1, ..., L) is associated to a 3D point measurement $p_m^k$ or a 2D point measurement $q_m^k$ in the keyframe k with the pose $T_k$ (k=1, ..., K). Similarly, a triplet (k, l', m') denotes an association such that a 3D plane landmark $\pi_{l'}$ (l'=1, ..., L') is associated to a 3D plane measurement $\pi_m^k$, in the keyframe k. Let $A_1$, $A_2$, and $A_3$ contain all the triplets representing the point-to-point associations, line-to-point associations, and plane-to-plane associations in the map, respectively. Then, the bundle adjustment 390 minimizes the following error function with respect to 3D point landmark coordinates, 3D plane landmark parameters, and keyframe poses $$E(p_1, \ldots, p_L; \pi_1, \ldots, \pi_L; T_1, \ldots, T_K) = \sum_{(k,l,m) \in A_1} \|p_l - T_k p_m^k\| + \sum_{(k,l,m) \in A_2} \mathfrak{d}(p_l, q_m^k) + \sum_{(k,l',m') \in A_3} \sum_a d(\pi_{l'}, T_k p_{m',a}^k). \quad (3)$$

Here, $d(\pi_{l'}, T_k p_{m',a}^k)$ is the distance of a 3D point $p_{m',a}^k$, which is sampled from the set of inlier points of the plane measurement $(\pi_m, I_{m'})$ in the keyframe k, to the plane landmark $\pi_l$.

Online SLAM

The bundle adjustment is performed asynchronously. We also perform loop closing. The loop closing first checks the appearance similarity of all pairs of keyframes in the map using a vector of locally aggregated descriptors (VLAD) descriptor determined based on the keypoints, see Jégou et al., "Aggregating local image descriptors into compact codes," IEEE Trans. Pattern Anal. Mach. Intell., vol. 34, no. 9, pp. 1704-1716, September 2012. The online SLAM also checks the similarity between pairs of keyframes. We do not try to close the loop when the current poses of the keyframes are too different. For the pairs of keyframes that pass the similarity tests, our system then performs the RANSAC registration using the hybrid correspondences, and if the RANSAC succeeds, the inlier correspondences are used to update the associations in the map.

Offline Postprocessing

The postprocessing is performed iteratively to update the associations and refine the landmark parameters and keyframe poses in the map. In an iteration of the postprocessing, every keyframe is re-registered with the map including the rest of the keyframes, and its correspondences are updated, i.e., splits and merges of the landmarks are performed when necessary. After all correspondences are updated, we perform bundle adjustment again to refine the landmark parameters and keyframe poses. We repeat the iteration, if the average change in the keyframe poses is greater than a threshold. Thus, the bundle adjustment runs sequentially in the offline postprocessing.

Summary of SLAM System

We acquire 310 frames 203 of a 3D scene 202 with, e.g., a red, green, blue, and depth (RGB-D) sensor 201. The data in the frames are processed sequentially as follows.

For each frame, we extract 311 keypoints. The keypoints include 2D points 321 without valid depths, and 3D points 322 with valid depths. We can also extract 312 3D planes 323. Then, we perform a correspondence search 330 between the current frame and the SLAM map 380 including previous processed frames to obtain point correspondences, and consider all possible plane correspondences between the input frame and the SLAM map. Next, we perform RANSAC registration 340 using the point-to-point, line-to-point, line-to-line, and plane-to-plane correspondences.

If RANSAC succeeds 350, then determine 360 if the frame is a new keyframe, and if yes, update 370 the SLAM map 380 accordingly, otherwise, we acquire the next frame. We perform bundle adjustment and a loop closing procedure 390 asynchronously to optimize 3D point landmarks, 3D plane landmarks, and keyframe poses in the SLAM map 380. Bundle adjustment simultaneously refines the 3D coordinates describing the geometry of the scene 202.

Effect of the Invention

The embodiments of the invention provide registered primitives for a SLAM system. One aim of the invention is to effectively use all data acquired by an RGB-D sensor. The system could be considered a hybrid of 2D and 3D SLAM. The 2D measurements are represented as 3D lines passing through the sensor's optical center and the 2D points.

Matching 3D points to the associated 3D lines improves the registration between the frames. Two matching 2D measurements are triangulated and added to a map.

The system enabled a better correspondence between frames yielding improvement in the registration accuracy. Furthermore, the same approach is used for an offline postprocessing procedure that can refine the reconstruction.

The results show that, for scenes with high depth variation, pinpoint SLAM and postprocessing increases the accuracy when compared to conventional systems.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for registering data, comprising steps of:
acquiring the data from a scene by a sensor at different viewpoints;
extracting, from the data, three-dimensional (3D) points and 3D lines, and descriptors associated with the 3D points and the 3D lines, wherein each 3D line is extracted as a ray connecting an optional center of the sensor with a two-dimensional (2) point;
selecting a first set of primitives represented in a first coordinate system of the sensor, wherein the first set of primitives includes at least three 3D points;
selecting a second set of primitives represented in a second coordinate system, wherein the second set of primitives includes any combination of 3D points and 3D lines to obtain at least three primitives; and
registering, using the first set of primitives and the second set of primitives, the 3D points with each other using point-to-point correspondence, and the 3D points with the 3D lines using point-to-line correspondence to obtain registered primitives, wherein the registered primitives are used in a simultaneous localization and mapping (SLAM) system, and wherein the steps are performed in a processor.

2. The method of claim 1, further comprising:
storing the registered primitives in a SLAM map; and optimizing the SLAM map by bundle adjustment.

3. The method of claim 1, wherein the sensor acquires the data as a sequence of frames for the different viewpoints of the scene, wherein each frame includes a pixel image and a corresponding depth map, and the steps are performed for each frame.

4. The method of claim 3, further comprising:
extracting keypoints from the data, wherein the keypoints include 3D keypoints with valid depths and two-dimensional (2D) keypoints without valid depths;
backprojecting the 3D keypoints with the valid depths to generate the 3D points, and representing the 2D keypoints with the invalid depths as lines passing through the 2D keypoint and an optical center of the sensor based on intrinsic parameters of the sensor to generate the 3D lines.

5. The method of claim 4, wherein the registering further comprising:
determining correspondences between the first set of primitives and the second set of primitives based on matching descriptors to produce point-to-point, point-to-line, and line-to-line correspondences.

6. The method of claim 1, wherein the registering is jointly.

7. The method of claim 1, wherein the data are acquired by multiple sensors.

8. The method of claim 1, wherein the registering of the 3D points uses a perspective-three-point procedure.

9. The method of claim 1, wherein the primitivies include 3D planes.

10. The method of claim 9, wherein registering considers all possible plane-to-plane correspondences.

11. The method of claim 9, wherein registering is performed via random sample consensus (RANSAC), which is initialized with triplets of correspondences in a following order of 3 plane-to-plane correspondences, 2 plane-to-plane and 1 point-to-point correspondences, 1 plane-to-plane and 2 point-to-point correspondences, 3 point-to-point correspondences, and 3 point-to-line correspondences.

12. A system for registering data, comprising:
a sensor, at different viewpoints, configured to acquiring the data from a scene; and
processor configured to extract, from the data, three-dimensional (3D) points and 3D lines, and descriptors associated with the 3D points and the 3D lines wherein each 3D line is extracted as a ray connecting an optical center of the sensor with a two-dimensional (2D) point, to select a first set of primitives represented in a first coordinate system of the sensor, wherein the first set of primitives includes at least three 3D points, to select a second set of primitives represented in a second coordinate system, wherein the second set of primitives includes any combination of 3D points and 3D lines to obtain at least three primitives, and to register, using the first set of primitives and the second set of primitives, the 3D points with each other using point-to-point correspondence, and the 3D points with the 3D lines using point-to-line correspondence to obtain registered primitives, wherein the registered primitives are used in a simultaneous localization and mapping (SLAM) system.

13. A method for registering data, comprising steps of:
acquiring the data from a scene by a sensor at different viewpoints;
extracting, from the data, three-dimensional (3D) points and 3D lines, and descriptors associated with the 3D points and the 3D lines;
selecting a first set of primitives represented in a first coordinate system of the sensor, wherein the first set of primitives includes at least three 3D points;
selecting a second set of primitives represented in a second coordinate system, wherein the second set of primitives includes any combination of 3D points and 3D lines to obtain at least three primitives; and
registering, using the first set of primitives and the second set of primitives, the 3D points with each other, and the 3D points with the 3D lines to obtain registered primitives, wherein the registered primitives are used in a simultaneous localization and mapping (SLAM) system, wherein the primitives include 3D planes, wherein registering is performed via random sample consensus (RANSAC), which is initialized with triplets of correspondences in a following order of 3 plane-to-plane correspondences, 2 plane-to-plane and 1 point-to-point correspondences, 1 point-to-plane and 2 point-to-point correspondences, 3 point-to-point correspondences, and 3 point-to-point correspondences, and wherein the steps are performed in a processor.

* * * * *